United States Patent
Durairaj et al.

(10) Patent No.: US 6,541,551 B1
(45) Date of Patent: Apr. 1, 2003

(54) RESORCINOLIC DERIVATIVE FOR RUBBER COMPOUNDS

(75) Inventors: Raj B. Durairaj, Monroeville, PA (US); Alex Peterson, Jr., Pittsburgh, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 110 days.

(21) Appl. No.: 09/742,587

(22) Filed: Dec. 21, 2000

(51) Int. Cl.⁷ .................................................. C08K 5/29
(52) U.S. Cl. ...................................................... 524/248
(58) Field of Search ......................................... 524/248

(56) References Cited

U.S. PATENT DOCUMENTS

| | | | |
|---|---|---|---|
| 2,246,924 A | * | 6/1941 | Paul ........................... 524/248 |
| 4,257,926 A | | 3/1981 | Tanimura et al. |
| 4,605,696 A | | 8/1986 | Benko et al. |
| 4,889,891 A | | 12/1989 | Durairaj et al. |
| 4,892,908 A | | 1/1990 | Durairaj et al. |
| 5,030,692 A | | 7/1991 | Durairaj |
| 5,049,618 A | | 9/1991 | Wideman et al. |
| 5,091,449 A | * | 2/1992 | Cantillo et al. ............. 524/248 |
| 5,244,725 A | | 9/1993 | Dressler et al. |
| 5,936,056 A | | 8/1999 | Durairaj et al. |

* cited by examiner

Primary Examiner—Peter D. Mulcahy
(74) Attorney, Agent, or Firm—Debra Z. Anderson; Eckert Seamans Cherin & Mellott, LLC

(57) ABSTRACT

A vulcanizable rubber composition and method for making the same are disclosed. The rubber composition comprises a rubber component mixed with a methylene donor and methylene acceptor; the methylene acceptor is 3-hydroxydiphenylamine.

15 Claims, No Drawings

RESORCINOLIC DERIVATIVE FOR RUBBER COMPOUNDS

FIELD OF THE INVENTION

The present invention relates to resorcinolic compounds for rubber reinforcement. More particularly, the invention relates to resorcinolic derivatives that can be substituted for resorcinol during rubber manufacture; use of the present resorcinolic compounds results in enhanced cure and mechanical properties of the cured rubber compound as compared with resorcinol, while maintaining the favorable properties of uncured rubber compounds achieved when resorcinol is used.

BACKGROUND OF THE INVENTION

Resorcinol, resorcinolic derivatives and resorcinol-formaldehyde resins have been used in the rubber industry as rubber compounds and adhesives. These resorcinolic compounds are unique materials in rubber compounding, since they act as thermosetting and vulcanizing plasticizers. They are very efficient plasticizers for rubber during the processing operations. The use of these compounds allows easier processing, higher loading and excellent extrusions of the rubber compounds.

Resorcinol and resorcinol based derivatives and resins, which act as methylene acceptors, have thermosetting properties that, upon curing, form a resin network within the rubbery polymer by reacting with various methylene donors. This results in increased hardness, abrasion resistance, aging resistance, solvent and oil resistance, and stiffness, and also gives a much improved finish to the cured rubber stock. This combination of plasticizing and reinforcing action is rare for a single material used in rubber compound formulations. In addition, resorcinolic compounds may act as antioxidants when used in natural rubber.

The network formation during rubber curing is more effective with phenolic methylene acceptor compounds having meta-substitution capability than with other compounds due to their high reactivity towards methylene donors. Examples of such phenolic compounds include resorcinol, phloroglucinol and m-aminophenol. The use of phloroglucinol and m-aminophenol in rubber compounding formulations is limited due to their high cost and melting points. Therefore, the most commonly employed methylene acceptor is resorcinol, due to its comparatively low cost and high reactivity. Resorcinol has three reactive sites, namely at C2, C4 and C6, indicated in formula 1 by the *:

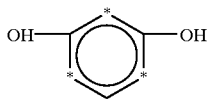

(1)

The high reactivity of resorcinol towards conventional methylene donors such as formaldehyde, hexamethylenetetraamine (HMTA) and hexamethoxymethylmelamine (HMMM), etc., is due to the presence of three reactive sites, meta with respect to each other, on the resorcinol molecule. The presence of two hydroxyl groups, meta with respect to each other, on the molecule further enhances the reactivity of the molecule towards methylene donors.

Though resorcinol provides enhanced physical, mechanical and adhesion properties in the cured rubber compounds, fuming associated with this material can be a problem to the tire industry. To overcome this problem, the tire industry needs compounds such as modified resorcinolic derivatives and resins that do not produce volatiles, such as those produced by resorcinol at mixing temperatures above 110° C. In addition to low volatility, the new resorcinolic compounds should have a reactivity similar to resorcinol in the rubber compound.

When the resorcinol is derivatized by attaching functional groups to either the benzene ring or hydroxyl groups, the reactivity of the resulting resorcinolic derivatives towards the methylene donor compounds is greatly reduced or altered. For example, substitutions at the 2, 4 or 6 positions of the benzene ring reduce the number of reactive sites for methylene donor interaction. Also, monoether or monoester derivatives have reduced reactivity towards methylene donor compounds as compared to resorcinol.

Resorcinol monobenzoate and derivatives of resorcinol such as resorcinol monorosinate, resorcinol diphenyl ether, resorcinol monomethyl ether, resorcinol monoacetate, phloroglucinol and derivatives used in the rubber composition are disclosed in U.S. Pat. No. 4,605,696. For example, to overcome the fuming of resorcinol, monoester derivatives of resorcinol, such as resorcinol monobenzoate, were used in the rubber compound. While improved dynamic mechanical properties were observed for the cured rubber, the monoester derivatives were less reactive than resorcinol due to the presence of an ester group substituent.

U.S. Pat. No. 4,892,908 discloses a keto derivative of resorcinol, namely benzoylresorcinol, which can be used as a low-fuming reinforcing material in the rubber compound. But, benzoylresorcinol has two reactive sites and a high melting point as compared to resorcinol.

U.S. Pat. No. 5,049,618 discloses a vulcanizable rubber composition, which comprises rubber, a filler and N-(3-hydroxyphenyl)maleimide. N-(3-hydroxyphenyl)maleimide has three active sites for methylene donor compounds but is believed to have a higher melting point than resorcinol.

Thus, while modifications to the resorcinol molecule are expected to lower the fuming characteristics of resorcinol, they also affect the networking efficiency during curing. Therefore, it is important to develop resorcinolic compounds/derivatives that can at least maintain the reactivity of resorcinol, if not impart higher reactivities towards the methylene donor compounds. Increased reactivity of resorcinolic derivatives is expected to speed up the network formation during rubber vulcanization, which ultimately enhances the physical and mechanical properties of the cured rubber.

SUMMARY OF THE INVENTION

The present invention provides for the use of 3-hydroxydiphenylamine ("3-HDPA") in place of resorcinol to enhance the physical and mechanical properties of both uncured and cured rubber compounds. Several advantages are realized by using 3-HDPA as a methylene acceptor. For example, 3-HDPA has a lower melting point than resorcinol; this means the compound has better dispersibility or mixing with rubber compounds at a lower temperature. Because of its high molecular weight, 3-HDPA has a lower volatility than resorcinol. While 3-HDPA has the same number of reactive sites as resorcinol, it has a higher reactivity, due to its being an m-aminophenol-type derivative.

The 3-hydroxydiphenylamines used in the present invention have been described. U.S. Pat. No. 2,376,112 discloses the synthesis of 3-hydroxydiphenylamine from resorcinol and aniline using 85% phosphoric acid. U.S. Pat. No. 4,265,833 outlines the preparation of various 3-hydroxyphenylamines from resorcinol and aniline using a PTSA catalyst. Neither of these patents teach or suggest the use of 3-hydroxydiphenylamine as a rubber-reinforcing compound, however.

One aspect of the present invention to provide rubber compounds having enhanced physical and mechanical properties in both their cured and uncured forms.

It is a further aspect of the invention to provide a method for making rubber compounds having improved physical and mechanical properties.

These and other aspects of the invention will be apparent based upon the following detailed description of the invention and appended claims.

DETAILED DESCRIPTION OF THE INVENTION

The present invention is directed to vulcanizable rubber compositions having improved physical and mechanical properties in both the cured and uncured forms. More specifically, the vulcanizable rubber compositions of the present invention comprise: (a) a rubber component selected from natural rubber, synthetic rubber or combinations thereof; (b) a methylene donor; and (c) a methylene acceptor that is substituted or unsubstituted 3-hydroxydiphenylamine ("3-HDPA"). If substituted, the 3-HDPA contains one or more C1-6 alkyl substituents, which can be straight chain or branched, and/or can contain an additional OH group on the phenyl ring.

"Rubber" as used herein refers to both natural and synthetic rubber. Representative synthetic rubber polymers include the butadiene polymers. Butadiene polymers include those polymers having rubber-like properties, prepared by polymerizing butadiene alone or with one or more other polymerizable ethylenically unsaturated compounds, such as styrene, methylstyrene, methyl isopropenyl ketone and acrylonitrile; the butadiene is preferably present in the mixture as at least 40% of the total polymerizable material. Other synthetic rubbers include the neoprene rubbers. Isobutylene rubber (butyl) and ethylene-propylene rubber (EPDM) may also be employed.

Any suitable methylene donor can be used. Methylene donors, according to the present invention, are capable of generating formaldehyde by heating during the vulcanization. Suitable examples of these methylene donors are hexamethylenetetraamine (HMTA), di- to hexamethylolmelamines or completely or partially etherified or esterified derivatives thereof, for example, hexamethoxy methylmelamine (HMMM), oxazolidine derivatives, N-methyl-1,3,5-dioxazine and the like.

Typically, the methylene acceptor, namely 3-HDPA, is incorporated into the rubber component in an amount ranging from about 1 to 25 parts by weight based on 100 parts by weight of the rubber component (1 to 25 phr). Preferably, the methylene acceptor is incorporated into the rubber component in an amount from about 1 to 5 phr.

Generally, the weight ratio of methylene acceptor to methylene donor is from about 1:10 to 10:1, more preferably 1:3 to 3:1. When the methylene donor is HMTA, the weight ratio is preferably at least.about 2:1.

It will be understood by those skilled in the art that the vulcanizable rubber composition of this invention may also include one or more additives such as sulfur, carbon black, zinc oxide, silica, antioxidants, a stearate, accelerators, oils and adhesion promoters.

A preferred method of making the rubber vulcanizate is to mix the rubber, carbon black, zinc oxide, lubricants and 3-HDPA in a Banbury mixer at a temperature of about 150° C. The resulting masterbatch is then compounded on a standard 2-roll rubber mill with sulfur accelerators and formaldehyde precursor. The vulcanization composition is then shaped and then cured.

In another embodiment of this invention, a vulcanizable rubber composition is provided as described above, further comprising (d) a reinforcing material. Any reinforcing material known in the art can be used, including, but not limited to, nylon, rayon, polyester, aramid, glass, steel (brass, zinc or bronze plated) or other organic or inorganic compositions. These reinforcing materials may be in the form of filaments, fibers, cords, or fabrics.

Following formation of the rubber component, vulcanization can be carried out by methods known in the art.

The present invention is therefore further directed to a method for making a rubber composition comprising mixing: (a) a rubber component selected from natural rubber, synthetic rubber or combinations thereof; (b) a methylene donor; and (c) a methylene acceptor that is substituted or unsubstituted 3-hydroxydiphenylamine ("3-HDPA"). The ratios of methylene acceptor to rubber and methylene acceptor to methylene donor are as described above for the present rubber compounds.

3-HDPA can be prepared according to any method known in the art. Such methods are described, for example, in U.S. Pat. Nos. 2,376,112 and 4,265,833, in which dihydroxybenzene and an aromatic amine are reacted. In the present method, the dihydroxybenzene is preferably resorcinol and the aromatic amine is aniline. The aniline can be substituted with one or more $C_{1-6}$ alkyl substituents. The resorcinol can be meta-substituted with a $C_{1-6}$ alkyl substituent or an additional OH moiety (i.e. phloroglucinol or 1,3,5-trihydroxybenzene). Suitable alkyl substituents are disclosed in U.S. Pat. No. 4,265,833, which is hereby incorporated by reference. "Substituted 3-HDPA" as used herein refers to 3-HDPA prepared from one or both of these substituted starting materials. Preparation of the compound is further described in the examples provided below. Briefly, resorcinol, aniline and a catalyst are mixed and heated for several hours at a temperature of between about 150–250° C.

It will be appreciated that the use of 3-HDPA in the compositions and methods described above result in a product having improved mechanical properties and enhanced cure when compared to similar compounds known in the art. The present inventors have discovered that 3-HDPA is an efficient plasticizer, offering good dispersibility with low volatility. Its high activity makes it especially suitable in network formation during the curing stage of rubber formation. Significantly, the compound offers properties to uncured rubber at least equal to if not better than resorcinol.

EXAMPLES

The following examples are intended to illustrate the invention and should not be construed as limiting the invention in any way.

Example No. 1

Into a 500-ml round bottomed flask equipped with a mechanical stirrer, thermometer and Dean-Stark condenser was charged 0.5 mole (55.0 grams) of resorcinol, 1.5 mole (139.7 grams) of aniline and 2.2 grams of PTSA catalyst.

The reaction mixture was heated to between 185–205° C.; about 11.0 grams of distillate was collected in the Dean-Stark trap in about 10.0 hours. After this, 1.0 gram of 50% wt./wt. aqueous NaOH solution was added to neutralize the catalyst. Then, vacuum was applied to distill out the excess aniline under 28" of Hg and 160–165° C. temperature conditions. The final reaction product weighed 91.9 grams and showed the following composition determined by LC/GC analysis.

| Composition (wt. %) | |
|---|---|
| Aniline | 5.7 |
| Resorcinol | 6.7 |
| 3-Hydroxydiphenylamine | 89.0 |
| Impurity (unknown) | 2.3 |

The melting point as determined by the capillary method was between about 65–70° C.

The above crude reaction product was recrystallized from an aqueous solution. The purified material showed a 75–79° C. melting point with the following composition (wt. %):

| | |
|---|---|
| Aniline | 0.2 |
| Resorcinol | 0.3 |
| Impurity (unknown) | 2.1 |
| 3-Hydroxydiphenylamine | 97.4 |

Example No. 2

The procedure described in Example No. 1 was repeated with 1.5 moles of resorcinol, 2.25 moles of aniline and 6.0 grams of PTSA catalyst. Continuous passage of nitrogen gas was done to remove the water by-product formed during the reaction. The reaction took about 21.0 hours to remove 27.1 grams of water distillate. The product weighed 280.0 grams after distilling out the excess aniline. The melting point was determined to be between 68–72° C. The chemical composition determined by the LC/GC analysis showed the presence of aniline=2.6 wt. %, resorcinol=0.6 wt. % and unknown impurities=4.0 wt.

Further purification of this crude material by an aqueous recrystallization method showed that the 3-hydroxydiphenylamine had a melting point of 71–75° C. and contained the following impurities (wt. %).

| | |
|---|---|
| Aniline | 0.07 |
| Resorcinol | 0.04 |
| Unknown | 4.6 |

Example No. 3

Black natural rubber compounds were prepared in three stages to test the processing and reinforcing effect of 3-hydroxydiphenylamine as compared to resorcinol. The basic compound formulation is shown in Table 1.

TABLE 1

| Rubber Compound Used in Testing Masterbatch | Parts by weight |
|---|---|
| 1. Natural Rubber | 100 |
| 2. Carbon Black (N-326) | 55 |
| 3. Zinc Oxide | 8 |
| 4. Stearic Acid | 1 |
| 5. N-(1,3-Dimethylbutyl)-N'-phenyl-p-phenylenediamine | 2 |
| 6. Pre-Vulcanization Inhibitor (N-(cyclohexylthio)phthalimide) | 0.2 |
| 7. Polymerized 1,2-dihydro-2,2,4-trimethyl quinoline | 1 |
| 8. Sulfur | 2 |
| 9. TBBS (N-t-Butyl-benzothiazole sulfenamide) | 1 |
| 10. HMTA (Hexamethylene tetraamine) | 0.5 |
| 11. Methylene Acceptor (Resorcinolic Compound) | 3 |

In the first stage, the black masterbatch was mixed in a lab-size internal mixer to a dump temperature of 150° C. and sheeted to a thickness of 8 mm. In the second stage, an appropriate amount of the black masterbatch for each compound was mixed with the required level of either resorcinol or 3-HDPA on a two-roll mill at 120–125° C. The compounds were sheeted and cooled. The sulfur, accelerator and an appropriate amount of HMTA were added to the compound in the third stage, using the two-roll mill at 90–95° C. The compounds were aged overnight in a constant temperature room at 23° C. and 50% relative humidity before testing.

Table 2 illustrates the cure behavior and the physical and mechanical properties of the cured rubber compounds.

TABLE 2

| CURE BEHAVIOR AND VULCANIZATE PROPERTIES | | |
|---|---|---|
| Methylene Acceptor: | Resorcinol | 3-Hydroxydi-phenylamine |
| MDR Rheometer Cure @ 125° C. (ASTM D-2084) | | |
| ML, dN-m | 2.8 | 2.86 |
| MDR Rheometer Cure @ 150° C. (ASTM D-2084) | | |
| MH, dN-m | 29.45 | 32.77 |
| ML, dN-m | 2.37 | 2.46 |
| TS, Minutes | 1.63 | 2.41 |
| T'90, Minutes | 7.66 | 7.47 |
| Cure Rate | 3.71 | 5 |
| Dynamic Properties-0.2% Strain** | | |
| G', MPa | 17.16 | 20.08 |
| Tan Delta | 0.069 | 0.066 |
| Dynamic Properties-2.0% Strain** | | |
| G', MPa | 10.13 | 12.02 |
| Tan Delta | 0.188 | 0.187 |
| Hardness, Shore A (ASTM-D1415) | 78 | 80 |
| Tensile Properties (ASTM D-412) | | |
| 100% Modulus, MPa | 4.84 | 5.32 |
| 300% Modulus, MPa | 20.25 | 21.43 |
| Strength, MPa | 28.54 | 29.76 |
| Elongation (%) | 423 | 423 |
| Energy to Break, N-m | 26.3 | 27.44 |
| Tear Strength (Die-C), KN/M | 132.3 | 132.3 |

**Rheometrics Mechanical Spectrometer 800, 1.0 Hz and Room Temperature

It is clear from the results in Table 2 that 3-hydroxydiphenylamine showed uncured rubber compound viscosity (ML from MDR Rheometer cure), T'90, tan delta (DMA) and tear strength properties similar to resorcinol. The 3-hydroxydiphenylamine of the present invention was observed to show significant improvement in properties such as MH, TS and cure rate (MDR data), G' (DMA data), Shore-A hardness and tensile properties as compared to resorcinol.

The improvement in properties observed with the 3-HDPA provides an advantage because the enhanced rubber compound properties can be easily achieved with 3-hydroxydiphenylamine without increasing the uncured rubber compound viscosity associated with resorcinol.

Example No. 4

To further illustrate the advantages of 3-hydroxydiphenylamine in improving the cured and uncured rubber compound properties, another masterbatch was prepared (Table 3). The rubber compound was prepared in a three-stage mixing procedure as explained in Example No. 3. In addition to resorcinol, two mono-substituted resorcinolic derivatives, namely dimethylbenzylresorcinol and 2,4-dihydroxybenzophenone, were used in the rubber compound formulations. The cure data, as well as other physical and mechanical property data, are outlined in

TABLE 3

| Rubber Compound Formulations Masterbatch | Parts by weight |
| --- | --- |
| 1. Natural Rubber | 100 |
| 2. Carbon Black (N-220) | 50 |
| 3. Zinc Oxide | 3 |
| 4. Stearic Acid | 2 |
| 5. N-(1,3-Dimethylbutyl)-N'-phenyl-p-phenylenediamine | 1 |
| 6. Akro wax 50/50 | 1 |
| 7. Sulfur | 2 |
| 8. TBBS (N-t-Butyl-benzothiazole sulfenamide) | 1 |
| 9. HMTA (Hexamethylene tetraamine) | 0.5 |
| 10. Methylene Acceptor (Resorcinolic Compound) | 3 |

TABLE 4

CURE BEHAVIOR AND VULCANIZATE PROPERTIES

| Methylene Acceptor: | Resorcinol | 4-Dimethylbenzyl Resorcinol | 2,4-Dihydroxy Benzophenone | 3-Hydroxydiphenylamine |
| --- | --- | --- | --- | --- |
| MDR Rheometer Cure @ 125° C. (ASTM D-2084) | | | | |
| ML, dN-m | 2.51 | 2.47 | 2.78 | 2.59 |
| MDR Rheometer Cure @ 150° C. (ASTM D-2084) | | | | |
| MH, dN-m | 28.17 | 21.74 | 27.48 | 33.11 |
| ML, dN-m | 2.15 | 2.03 | 2.31 | 2.15 |
| TS, Minutes | 1.51 | 3.47 | 2.35 | 2.39 |
| T'90, Minutes | 6.11 | 8.6 | 8.29 | 7.07 |
| Cure Rate | 4.66 | 3.07 | 3.48 | 5.53 |
| Dynamic Properties-0.2% Strain** | | | | |
| G', MPa | 19.02 | 17.17 | 23.23 | 25.11 |
| Tan Delta | 0.083 | 0.09 | 0.076 | 0.073 |
| Dynamic Properties-2.0% Strain** | | | | |
| G', MPa | 9.92 | 8.8 | 12.19 | 13.9 |
| Tan Delta | 0.237 | 0.246 | 0.229 | 0.223 |
| Hardness, Shore A (ASTM-D1415) | | | | |

**Rheometrics Mechanical Spectrometer 800, 1.0 Hz and Room Temperature

As can be seen from Table 4, dimethylbenzyl resorcinol and 3-hydroxydiphenylamine produced uncured rubber compound viscosity (ML from MDR cure) similar to resorcinol whereas 2,4-dihydroxybenzophenone produced higher viscosity. However, all the physical and mechanical properties of the dimethylbenzyl resorcinol based compound were lower than that of resorcinol, 2,4-dihydroxybenzophenone and 3-hydroxydiphenylamine. By comparing the cure rate, MH, G' and Shore-A hardness properties, it is clear that 3-hydroxydiphenylamine showed better rubber compound properties than 2,4-dihydroxybenzophenone and resorcinol. The MDR Rheometer cure rate data clearly shows that 3-hydroxydiphenylamine has higher reactivity than resorcinol and the other resorcinol derivatives tested in this example.

The reactivity of a methylene acceptor, such as 3-hydroxydiphenylamine, is important in the in situ resin formation with the methylene donor, such as HMTA, to improve the hardness, tensile and dynamic mechanical properties of the cured rubber compounds.

Example No. 5

Fuming of resorcinol and its derivatives at rubber compound mixing temperatures above 1 10° C. is associated with the volatile products obtained from the unreacted resorcinol. One way to determine the volatility of a material is to run the thermogravimetric analysis. Table 5 shows the thermogravimetric analysis results of resorcinol and 3-hydroxydiphenylamine carried out in a nitrogen atmosphere.

TABLE 5

Thermogravimetric Analysis Results of Resorcinol and 3-Hydroxydiphenylamine

| | % Weight Loss at * | | | | |
| --- | --- | --- | --- | --- | --- |
| Compound | 125° C. | 150° C. | 175° C. | 200° C. | 225° C. |
| 1. Resorcinol | 1.7 | 8.5 | 32.6 | 96.4 | 99.1 |
| 2. 3-Hydroxydiphenylamine | 0.2 | 0.5 | 1.4 | 4.5 | 13.7 |

*Heating Rate: 10° C./Minute in Nitrogen Atmosphere

From the Table 5 results, it is evident that the 3-hydroxydiphenylamine produces significantly less volatiles at elevated temperatures as compared to resorcinol.

Whereas particular embodiments of this invention have been described above for purposes of illustration, it will be evident to those skilled in the art that numerous variations of the details of the present invention may be made without departing from the invention as defined in the appended claims.

What is claimed is:

1. A vulcanizable rubber composition comprising:
   a) a rubber component selected from natural rubber, synthetic rubber, or combinations thereof;
   b) a methylene donor; and
   c) a methylene acceptor selected from the group consisting of substituted or unsubstituted 3-hydroxydiphenylamine.

2. The composition of claim 1, wherein said methylene acceptor is incorporated into said rubber component in an amount from about 1 to 25 parts by weight based on 100 parts by weight of said rubber component.

3. The composition of claim 2, wherein said methylene acceptor is incorporated into said rubber component in an amount from about 1 to 5 parts by weight based on 100 parts by weight of said rubber component.

4. The composition of claim 1, wherein the weight ratio of methylene acceptor to methylene donor is between about 1:10 and 10:1.

5. The composition of claim 1, wherein said methylene donor is selected from the group consisting of hexamethylenetetraamine, di-, tri-, tetra-, penta-, or hexa-N-methylol-melamine, hexamethoxymethylmelamine, oxazolidine and N-methyl-1,3,5-dioxazene.

6. The compound of claim 5, wherein said methylene donor is hexamethylenetetraamine and the weight ratio of methylene acceptor to methylene donor is at least 2:1.

7. The composition of claim 1, further including (d) a reinforcing material.

8. The composition of claim 1, further comprising one or more additives selected from the group consisting of sulfur, carbon black, zinc oxide, silica, an antioxidant, a stearate, an accelerator, an oil and an adhesion promoter.

9. The compound of claim 1, wherein the methylene acceptor is unsubstituted 3-hydroxydiphenylamine.

10. A method for making a rubber composition comprising the steps of mixing:
    a) a rubber component selected from natural rubber, synthetic rubber, or combinations thereof;
    b) a methylene donor; and
    c) a methylene acceptor selected from the group consisting of substituted or unsubstituted 3-hydroxydiphenylamine.

11. The method of claim 10, wherein said methylene acceptor is incorporated into said rubber component in an amount from about 1 to 25 parts by weight based on 100 parts by weight of said rubber component.

12. The method of claim 11, wherein said methylene acceptor is incorporated into said rubber component in an amount from about 1 to 5 parts by weight based on 100 parts by weight of said rubber component.

13. The method of claim 10, wherein the weight ratio of methylene acceptor to methylene donor is between about 1:10 and 10:1.

14. The method of claim 10, wherein said methylene donor is selected from the group consisting of hexamethylenetetraamine, di-, tri-, tetra-, penta-, or hexa-N-methylolmelamine, hexamethoxymethylmelamine, oxazolidine and N-methyl- 1,3 ,5-dioxazene.

15. The method of claim 10, wherein said methylene acceptor is unsubstituted 3-hydroxydiphenylamine.

* * * * *

UNITED STATES PATENT AND TRADEMARK OFFICE
CERTIFICATE OF CORRECTION

PATENT NO.     : 6,541,551 B1
DATED          : April 1, 2003
INVENTOR(S)    : Raj B. Durairaj et al.

It is certified that error appears in the above-identified patent and that said Letters Patent is hereby corrected as shown below:

Column 5,
Line 48, after "4.0 wt." insert -- % --.

Column 7,
Line 25, after "outlined in", insert -- Table 4 --.

Column 8,
Table 4, line 15, insert whole numbers lining up with decimals in columns
-- 77, 74, 79, 82 --.
Line 43, "1 10º", should read -- 110º --.

Signed and Sealed this

Ninth Day of September, 2003

JAMES E. ROGAN
*Director of the United States Patent and Trademark Office*